3,138,621
16-HYDROXY-ACETYL-PREGNENE DERIVATIVES AND PROCESS FOR THEIR MANUFACTURE
Werner Fritsch, Neuenhain, Taunus, and Erhard Daase, Kelkheim, Taunus, Germany, assignors to Farbwerke Hoechst Aktiengesellschaft vormals Meister Lucius & Brüning, Frankfurt am Main, Germany, a corporation of Germany
No Drawing. Filed June 9, 1961, Ser. No. 115,891
Claims priority, application Germany June 10, 1960
6 Claims. (Cl. 260—397.4)

The present invention relates to new 16-hydroxy-acetyl-pregnene derivatives of the formula

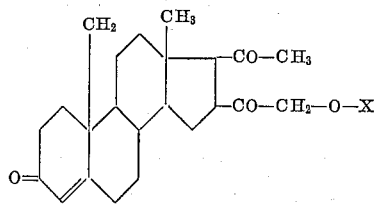

wherein X stands for a low molecular aliphatic, cyclo-aliphatic-aliphatic, aromatic carboxylic or dicarboxylic acid radical, and alkali metal salts of said compounds.

This invention further relates to pharmaceutical preparations containing as active substances in addition to the usual pharmaceutical carriers and/or stabilizers the compounds of the formula given above.

Finally, the present invention relates also to the manufacture of such compounds by treating a 16-halogen-acetyl-3β-formoxy-$\Delta^5$-pregnene derivative with acylating agents, preferably with the alkali metal salts of a monocarboxylic acid or dicarboxylic acid in dialkylformamides, and, if desired, oxidizing by the Oppenauer method the 16-acyloxy-acetyl-3β-formoxy-$\Delta^5$-pregnene derivative so obtained, saponifying it in an acid medium and, if desired, acylating again the 16-hydroxyacetyl-3-keto-$\Delta^4$-pregnene derivative with a reactive functional derivative of a monocarboxylic acid or dicarboxylic acid.

When 3-formoxy-16-chloroacetyl-$\Delta^5$-pregnene-20-one is used as the starting material the reaction takes place, for example, according to the following scheme:

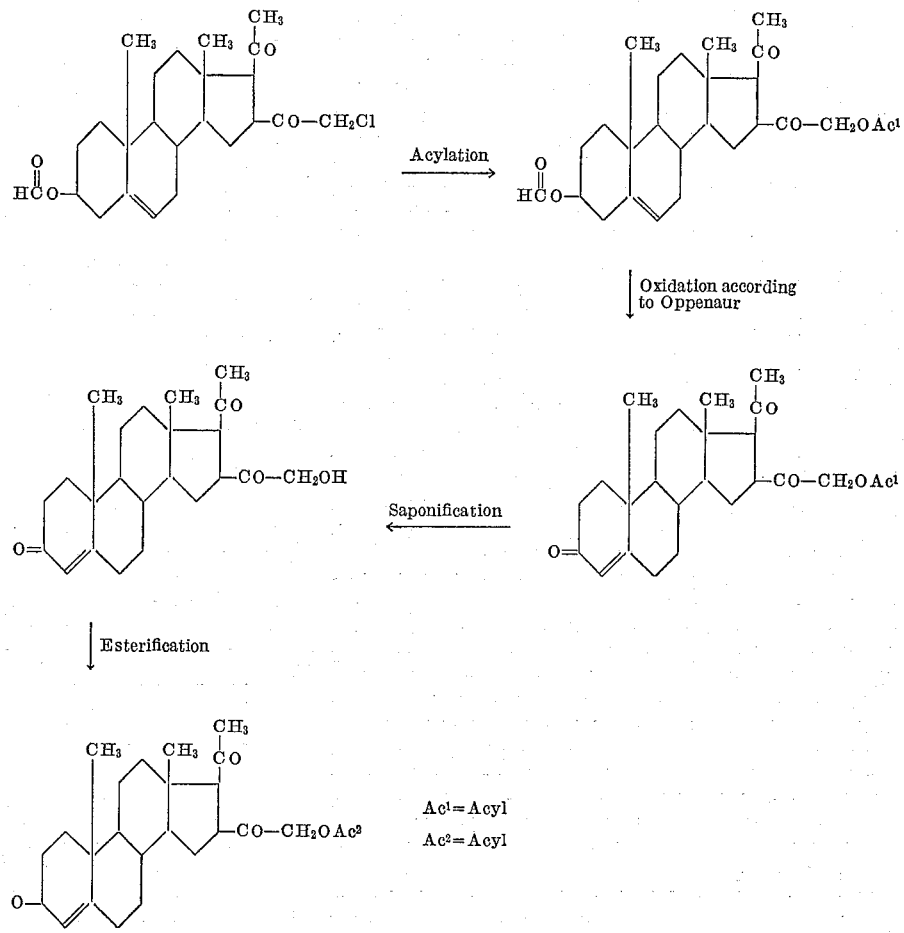

As starting materials for the process of the present invention for example

3β-formoxy-16-chloroacetyl-Δ⁵-pregnene-20-one,
3β-formoxy-16-bromoacetyl-Δ⁵-pregnene-20-one,
3β-formoxy-16-iodoacetyl-Δ⁵-pregnene-20-one can be used. The starting compounds can, for example, be prepared from the corresponding 3β-formoxy-16-diazoketones as described in copending application Serial No. 104,821, filed April 24, 1961.

For the acylation there may, for example, be used: low molecular aliphatic monocarboxylic acids such as acetic acid, propionic acid and butyric acid, cycloaliphatic monocarboxylic acids such as cyclopentylcarboxylic acids, cyclohexyl-carboxylic acids or cycloheptyl-carboxylic acids which are based on the afore-mentioned carboxylic acids, or aromatic carboxylic acids, for example, benzoic acid. As dicarboxylic acids there are mentioned for example malonic acid, succinic acid, glutaric acid and phthalic acid. The carboxylic acids are suitably reacted with the halogen substituent of the acyl radical in the 16-position in the form of their alkali metal salts; consequently, there can be used the sodium, potassium or lithium salts of the corresponding mono- or dicarboxylic acid.

The acylation is carried out in an inert solvent or a mixture of solvents miscible with water. As particularly suitable solvents there are especially mentioned anhydrous or aqueous dialkylformamides, particularly dimethylformamide; if desired, there may be worked in the presence of a third solvent such as glacial acetic acid. The reaction is carried out at a temperature ranging from 50° C. to the reflux temperature of the solvent, preferably from 50° C. to 100° C. The reaction periods vary between 30 minutes and several hours. The use of alkali metal salts of dicarboxylic acids such as the dipotassium salt of the succinic acid leads to the corresponding dicarboxylic-di-(16-hydroxy-acetyl-3-formoxy)-esters. An oxidation of 16-acyloxyacetyl-3β-formoxy-Δ⁵-pregnene to obtain the corresponding 3-keto-derivatives is carried out by the usual conditions of the Oppenauer-oxidation with simultaneous spontaneous saponification of the formoxy-groups in the 3-position. The compounds are suitably caused to react in an inert solvent, for example benzene, xylene or advantageously toluene, with an aluminum alcoholate, such, for example, as aluminum isopropylate or butylate in the presence of ketones, such as acetone or cyclohexanone. As reaction temperature there is suitably used the boiling temperature of the solvent employed. Generally, the Oppenauer-oxidation takes place very rapidly and is completed after about one hour.

If desired, the 3-keto-derivatives obtained as raw products can be saponified to obtain the corresponding 16-hydroxyacetyl compounds. This saponification is advantageously effected by hydrolysis in an acid medium, preferably with the use of aqueous hydrochloric acid or p-toluene sulfonic acid in aliphatic solvents for example ketones or alcohols such as ethanol at the boiling temperature of the respective solvent. In general, the saponification is completed after 30–120 minutes.

If desired, the 3-keto-16-hydroxy-acetyl derivatives obtained as saponification products can be esterified in a further reaction stage by treating them with reactive functional derivatives of aliphatic and aromatic mono- or dicarboxylic acids, preferably in the presence of tertiary amines such as pyridine. By the action of dicarboxylic acid anhydrides such as succinic acid anhydride in the presence of pyridine there can be prepared the corresponding dicarboxylic semi-esters the alkali or ammonium salts of which are distinguished by a good solubility in water. Furthermore, the esters of β-keto-carboxylic acids can be obtained by transesterification for example with acetoacetic acid ester.

The new products of the invention may contain further substituents in the steroid nucleus, for example methyl groups in the 2- and/or 6-position or halogen atoms such as fluorine atoms in the 6- or 9-position, or hydroxyl or keto groups in the 11-position. It has been found that the course of the process is not affected by the presence of such substituents.

The novel products of this invention possess valuable therapeutic properties, they are particularly distinguished by hormone effects and diuretic effects. On the other hand, they represent intermediate products for the preparation of therapeutically useful compounds possessing antialdosterone effects. The products of the invention can be administered as such or in the form of pharmaceutical preparations, for example as oily suspensions, as crystalline suspensions or in the form of solutions, capsules or tablets, either orally or parenterally.

The following examples serve to illustrate the invention but they are not intended to limit it thereto.

EXAMPLE 1

(a) *3β-Formoxy-16-Acetoxyacetyl-Δ⁵-Pregnene-20-One*

40 grams of 3β-formoxy-16-chloroacetyl-Δ⁵-pregnene-20-one were added under a nitrogen atmosphere, while stirring, to a suspension of 45.8 grams of freshly molten potassium acetate in 330 cc. of dimethylformamide. The reaction mixture was then heated for one hour at 75–80° C. and, after cooling, introduced into 500 cc. of water while stirring. The precipitate was filtered off with suction and washed well with water. The crude product of the invention was purified by recrystallisation from acetone. 42 grams of 3β-formoxy-16-acetoxyacetyl-Δ⁵-pregnene-20-one were obtained having a melting point of 162° C. (Kofler-heater).

(b) *16-Acetoxyacetyl-Δ⁴-Pregnene-3.20-Dione*

60.8 grams of 3β-formoxy-16-acetoxyacetyl-Δ⁵-pregnene-20-one were dissolved in the hot in a mixture of 2.28 liters of toluene and 670 cc. of cyclohexanone. About 400 cc. of toluene were then distilled off. The boiling solution was then mixed with a solution of 21 grams of aluminum isopropylate in 400 cc. of toluene. After boiling for one hour under reflux, 900 cc. of water were added to the solution while stirring and the reaction mixture was then subjected to a distillation with steam. The resulting aqueous suspension was then concentrated under reduced pressure to dryness, the residue from distillation was thoroughly extracted by means of hot methylene chloride, the extracts were strongly concentrated, mixed with ether and the crystals so obtained were filtered off with suction. After recrystallisation from little acetone and much ether 43.3 grams of 16-acetoxyacetyl-Δ⁴-pregnene-3.20-dione were obtained having a melting point of 136° C. (Kofler-heater).

(c) *16-Hydroxy-Acetyl-Δ⁴-Pregnene-3.20-Dione*

6.4 grams of 16-acetoxyacetyl-Δ⁴-pregnene-3.20-dione were heated under reflux for 2 hours at the boil in a solution of 6.5 grams of p-toluene sulfonic acid in 162 cc. of alcohol. The reaction mixture was cooled and stirred into 600 cc. of water. After allowing to stand for some time in an ice bath, the crystals that had precipitated were filtered off with suction, washed well with water and then recrystallised from acetone. 4.71 grams of 16-hydroxy-acetyl-Δ⁴-pregnene-3.20-dione were obtained having a melting point of 197° C. (Kofler-heater).

(d) *Succinic Acid Semiester of 16-Hydroxy-Acetyl-Δ⁴-Pregnene-3.20-Dione*

5.6 grams of 16-hydroxy-acetyl-Δ⁴-pregnene-3.20-dione and 6 grams of succinic acid anhydride were dissolved at room temperature in 45 cc. of pyridine. After 12 hours the reaction mixture was stirred into a mixture of 400 grams of ice and 55 cc. of concentrated hydrochloric acid. After allowing the mixture to stand for a while the precipitate which crystallized out was filtered off and washed well with water. After recrystallisation from a mixture of methylene chloride and ether 6.1 grams of succinic acid semiester of 16-hydroxyacetyl-Δ⁴-pregnene-3.20-dione were obtained having a melting point of 131° C. (Kofler-heater).

EXAMPLE 2

*3β-Formoxy-16-Cyclopentylpropionoxyacetyl-Δ⁵-Pregnene-20-One*

(a) 2.28 grams of 3β-formoxy-16-chloroacetyl-Δ⁵-pregnene-20-one and 2.28 grams of potassium salt of the cyclopentylpropionic acid were suspended in 30 cc. of dimethylformamide and the whole was stirred for 2½ hours at a temperature ranging from 60–70° C. After cooling the reaction mixture was stirred into 150 cc. of water. The precipitate was then extracted with methylene chloride. The methylene chloride phase was washed twice with water and once with sodium bicarbonate, dried over sodium sulfate and concentrated to dryness under reduced pressure at 30° C. After recrystallisation from methanol 1.2 grams of 3β-formoxy-16-cyclopentylpropionoxyacetyl-Δ⁵-pregnene-20-one were obtained having a melting point of 117° C. (Kofler-heater).

(b) In correspondence with the directions given in Example 1b 16-cyclo-pentylpropionoxy-acetyl-Δ⁴-pregnene-3.20-dione was obtained from 3β-formoxy-16-cyclopentylpropionoxyacetyl-Δ⁵-pregnene-20-one by the Oppenauer oxidation method.

EXAMPLE 3

(a) *3β-Formoxy-16-Benzoxyacetyl-Δ⁵-Pregnene-20-One*

2.28 grams of 3β-formoxy-16-chloroacetyl-Δ⁵-pregnene-20-one and 2.28 grams of potassium salt of the benzoic acid were suspended in 20 cc. of dimethylformamide and stirred for 2½ hours at a temperature ranging from 60–70° C. After cooling, the reaction mixture was stirred into 150 cc. of water. The precipitate was then extracted by means of methylene chloride, the methylene chloride phase was washed twice with water and once with a sodium bicarbonate solution and, after drying over sodium sulfate, concentrated to dryness under reduced pressure. After recrystallisation from methanol 2.1 grams of 3β-formoxy-16-benzoxyacetyl-Δ⁵-pregnene - 20 - one were obtained having a melting point of 152° C.

(b) *16-Benzoxyacetyl-Δ⁴-Pregnene-3.20-Dione*

1.7 grams of 3β-formoxy-16-benzoxyacetyl-Δ⁵-pregnene-20-one were dissolved in the hot in a mixture of 80 cc. of toluene and 30 cc. of cyclohexanone. After distillation of about 10 cc. of toluene, the solution was mixed with a solution of 3 grams of aluminum isopropylate in 10 cc. of toluene and the whole was heated at the boil for one hour under reflux. The reaction mixture was then subjected to steam distillation until only clear water distilled over. The resulting suspension was concentrated to dryness under reduced pressure and then extracted twice, each time with 200 cc. of methylene chloride. The residue was recrystallised from acetone. 1.07 grams of 16-benzoxyacetyl-Δ⁴-pregnene-3.20-dione were obtained having a melting point of 185° C.

EXAMPLE 4

*Succinic Acid-Di-(16-Hydroxy-Acetyl-3β-Formoxy-Δ⁵-Pregnene-20-One)-Ester*

4.56 grams of 3β-formoxy-16-chloroacetyl-Δ⁵-pregnene-20-one and 4.56 grams of potassium salt of succinic acid were suspended in 60 cc. of dimethylformamide and stirred for 2½ hours at 70° C. After cooling the reaction mixture was stirred into 200 cc. of water, the precipitate was suction-filtered, washed well with water and then dissolved in methylene chloride. After washing the methylene chloride extract with water and drying over sodium sulfate, it was concentrated to dryness under a reduced pressure. After recrystallisation from a mixture of methylene chloride and ether, 3.1 grams of succinic acid di-(16-hydroxy-acetyl-3β-formoxy-Δ⁵-pregnene-20-one)-ester were obtained having a melting point of 138° C.

EXAMPLE 5

*16-Acetoacetoxy-Acetyl-Δ⁴-Pregnene-3.20-Dione*

2 grams of 16-hydroxy-acetyl-Δ⁴-pregnene-3.20-dione in 14 cc. of acetoacetic ester were heated for 5 hours at 100° C. under a slightly reduced nitrogen atmosphere (about 300–500 mm. of mercury). The acetoacetic acid ester in excess was then distilled off in a steam jet vacuum. The viscous residue was recrystallised from a little acetone and from ether. 2.06 grams of 16-acetoacetoxy-acetyl-Δ⁴-pregnene-3.20-dione were obtained having a melting point of 142° C. (Kofler-heater).

We claim:

1. A member selected from the group consisting of compounds of the formula

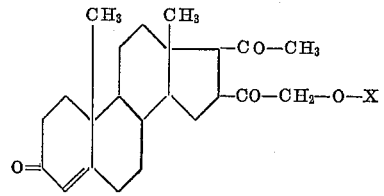

in which X represents an acyl radical of a carboxylic acid selected from the group consisting of (1) aliphatic carboxylic acids containing up to 4 carbon atoms, (2) the same aliphatic carboxylic acids substituted by a cycloaliphatic radical containing from 5–7 carbon atoms, (3) benzoic acid, (4) phthalic acid, and (5) dicarboxylic acids having from 3–5 carbon atoms and non-toxic alkali metal salts thereof.

2. The compound of the formula

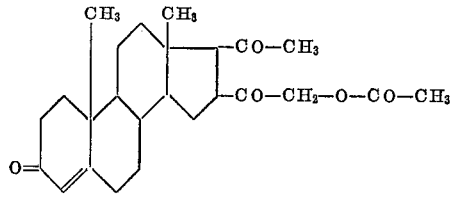

3. The compound of the formula

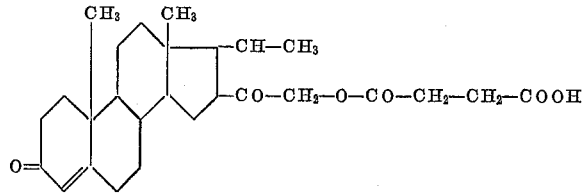

4. The compound of the formula

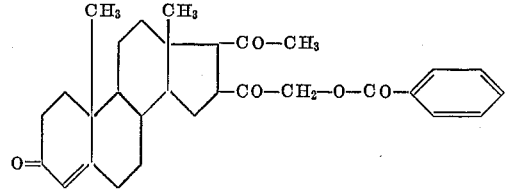

5. The compound of the formula
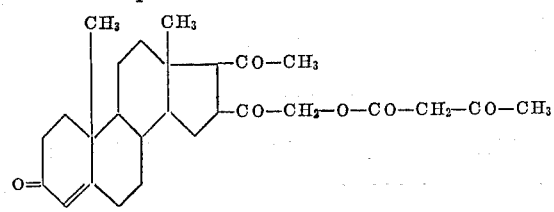
6. The compound of the formula
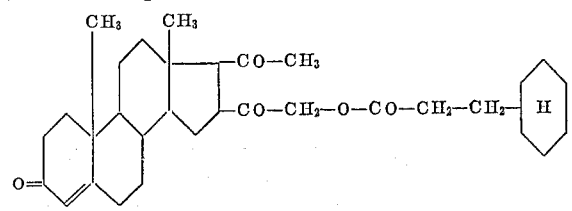
References Cited in the file of this patent
UNITED STATES PATENTS
2,932,655    Mazur et al. _____ Apr. 12, 1960